US009930483B2

(12) United States Patent
Lempinski

(10) Patent No.: US 9,930,483 B2
(45) Date of Patent: Mar. 27, 2018

(54) METHOD AND SYSTEM FOR AUTOMATIC ATTENDANCE MONITORING

(71) Applicant: TENVIRK Sp. z o.o., Chorzow (PL)

(72) Inventor: Tomasz Lempinski, Chorzw (PL)

(73) Assignee: TENVIRK Sp. z o.o. (PL)

(*) Notice: Subject to any disclaimer, the term of this patent is extended or adjusted under 35 U.S.C. 154(b) by 0 days.

(21) Appl. No.: 15/512,385

(22) PCT Filed: Sep. 11, 2015

(86) PCT No.: PCT/PL2015/000143
§ 371 (c)(1),
(2) Date: Mar. 17, 2017

(87) PCT Pub. No.: WO2016/048178
PCT Pub. Date: Mar. 31, 2016

(65) Prior Publication Data
US 2017/0238130 A1 Aug. 17, 2017

(30) Foreign Application Priority Data
Sep. 24, 2014 (PL) ........................................ 409577

(51) Int. Cl.
H04W 24/00 (2009.01)
H04W 4/02 (2018.01)
(Continued)

(52) U.S. Cl.
CPC ............ *H04W 4/02* (2013.01); *G06Q 10/109* (2013.01); *H04W 68/005* (2013.01)

(58) Field of Classification Search
CPC ..... H04W 4/02; H04W 68/005; G06Q 10/109
(Continued)

(56) References Cited

U.S. PATENT DOCUMENTS

2007/0171046 A1* 7/2007 Diem ..................... G06Q 10/00
340/539.13
2012/0278211 A1* 11/2012 Loveland ................. G07C 1/10
705/32

(Continued)

FOREIGN PATENT DOCUMENTS

CN 203 535 671 U 4/2014
EP 0 583 623 A1 2/1994

(Continued)

OTHER PUBLICATIONS

International Search Report for Int'l Application No. PCT/PL2015/000143, dated Nov. 25, 2015, 4 pages.
English Abstract CN 203 535 671 U, 2 pages.

*Primary Examiner* — William Nealon
(74) *Attorney, Agent, or Firm* — Ware, Fressola, Maguire & Barber LLP

(57) ABSTRACT

Attendance of subjects within a monitored area includes periodic steps of: (a) transmitting by wireless transmitters (23) of identification modules (2), assigned and attachable to subjects (7), notification messages (Nm) with identification data; (b) receiving by a wireless base receiver (3) the notification messages (Nm) transmitted by the transmitters (23) and a wireless base transmitter (11) transmitting receipt confirmation messages (Cm); (c) determining attendance statuses (As) based on the received notification messages (Nm); wherein (a) additionally includes transmitting individual motion signals (Ims) representing a motion of a given identification module (2), and (c) additionally includes determining attendance status (As) of an "absent" value in a case of indicating for a predetermined time period by the individual motion signal (Ims) for a motionless status of an identification module (2) assigned to the given subject (7). Also a system is shown for an automatic monitoring of (Continued)

attendance of subjects within a predetermined monitored area.

18 Claims, 4 Drawing Sheets

(51) Int. Cl.
*G06Q 10/10* (2012.01)
*H04W 68/00* (2009.01)

(58) Field of Classification Search
USPC .................................................. 455/456.2
See application file for complete search history.

(56) References Cited

U.S. PATENT DOCUMENTS

2014/0213284 A1* 7/2014 Yang ..................... G01S 11/06
455/456.1
2015/0281656 A1* 10/2015 Chien ..................... H04L 67/18
348/143

FOREIGN PATENT DOCUMENTS

WO 02/080113 A1 10/2002
WO 2012/149212 A1 11/2012

* cited by examiner

METHOD AND SYSTEM FOR AUTOMATIC ATTENDANCE MONITORING

The present invention relates to a method for an automatic monitoring of attendance of subjects within a predetermined monitored area comprising periodically realized steps of:

a) transmitting by a wireless transmitter of at least one identification module assigned and attachable to a given subject the attendance of which is to be monitored a notification message comprising an individual attendance signal comprising identification data of the given identification module stored in the module internal memory;

b) receiving by a wireless base receiver notification messages transmitted by the transmitters of said identification modules located within the monitored area;

c) determining attendance statuses of individual subjects within the monitored area by a computation-decision unit, connected to said wireless base receiver, on the basis of notification messages received by said base receiver from identification modules assigned and attachable to individual subjects, wherein a given subject attendance status of an "absent" value is determined in a case of:

a lack of a reception of an individual attendance signal of the identification module assigned to the given subject for a predetermined time period;

d) registering in a memory by the computation-decision unit an information related with attendance statuses of individual subjects in the monitored area.

The present invention relates also to a system for an automatic monitoring of attendance of subjects within a predetermined monitored area in which the above method is carried out.

BACKGROUND OF THE INVENTION

An exemplary, known from the prior art and similar to the above described solution, method of a localization of an object or person within the monitored geographical area is disclosed in the European patent application EP 0 583 623 A1. This method is realized with using a number of base stations and a number of localization transmitters. Each base station comprises at least one localization receiver and is assigned to a given and limited subarea of the monitored geographical area, wherein the base stations are distributed in such a manner that their subareas cover the whole monitored area. The localization transmitters are connected to subjects that are to be localized and transmit signals that are received by the localization receivers. The method comprises the following steps:

a) periodical emissions of a localization message comprising an identification code assigned to an identity of the subject to which a given transmitter is connected, wherein the emissions are realized by the localization transmitters;

b) receiving of the emitted localization messages by at least one localization receiver;

c) storing in a database of messages by the base station corresponding to a given transmitter from the stage b), records comprising identification codes contained in the emitted messages; and d) retrieving the code corresponding to a given subject in the database.

An automation of known solutions of this type consists in a lack of a necessity of any interaction of a given subject the attendance of which is to be monitored on a given area. The one and only duty of a subject is to carry an identification transmitter with it. Such a system automatically determines an attendance of a given subject in the monitored area and determine a given localization transmitter incoming and outgoing respectively on and from the monitored area.

The essential disadvantage of such known solutions is a lack of a resistance thereof against an attempts of a simulation of attendance of a given subject assigned to a given localization transmitter by:

carrying in a transmitter onto the monitored area, leaving the transmitter in the monitored area, and subsequently coming out from the monitored area by the subject, the attendance of which are to be monitored, without the left transmitter;

carrying in a number of transmitters by one subject onto the monitored area;

exchanging transmitters between subjects.

The only one known method for providing in such solutions a resistance against such attempts of an attendance simulation is to fixedly connect a transmitter to a given subject that is to be monitored in a manner disabling for an unauthorized detachment of a transmitter from the subject to which it is assigned. Such a solution may however not be used in each case.

The above presented exemplary disadvantages cause that such an automatic attendance monitoring, featuring apparently some advantages, have not as yet found a practical use, for example in working time registration systems where a use thereof seems to be particularly advantageous.

Practical solutions for a working time registration are still based solely on an entrance-exit terminals reading information from personal proximity cards of employees (for example RFID cards, cards provided with a bar code or cards with a magnetic strip) and employee biometric information during an employee approaching the terminal. For a correct registration these solutions require on each ingoing and outgoing episode, both in and out of the monitored work area, an interaction of an employee consisted in bringing a proximity card near to the terminal or an appropriate part of a body in a case of a biometry employment. Therefore in order to prevent for employees to passing through such terminals without reading of required data from a proximity card or without acquiring biometric information, such terminals have to be additionally provided with special gates that are open only after reading the required proximity card information or biometric data.

In such known systems an occurrence of reading of proximity card data or biometric data reading evidences solely a passing of a given employee through a terminal. Therefore in such solutions it is necessary to implement additional mechanisms (for example by an interaction with an employee, that by means of an appropriate user interface manually determines whether a given passing is an ingoing or an outgoing, or on the basis of a passing "history" analysis) specifying whether a given passing through a terminal constitutes an ingoing or an outgoing event, or simply to install individual entrance terminals and exit terminals.

Obviously in order to provide security and reliability for such a type of systems, their terminals have to be installed at all entrances and exits respectively into and out of the monitored working area. Therefore an employment of such systems is not possible in an obvious manner in a case of open working area, such as for example a construction site.

As a possibility of a simulation of an ingoing/outgoing of an employee assigned to a given proximity card is obvious, for example by providing a proximity card for reading in the terminal by a different employee not assigned to the card being read, the system of such a type have to be additionally provided with an additional appropriate security mechanism comprising for example an identity verification of an employee presenting a given proximity card, wherein the verification may for example comprise an acquisition of biometric information, photo- or video registration of an episode of bringing a card near to an entrance/exit terminal reader. However an automatic detection of such unauthorized operations using photo- and video registration may be in many cases impossible as it is difficult to recognize an image of a given employee in each situation and to automatically compare the image with a standard pattern.

Furthermore in many cases using biometric system for a working time registration may be restricted by legal restraints.

It is clearly visible that in a comparison with the automatic attendance monitoring solutions using active identification modules, the presently used working time registration systems are much more complicated with regard to a structure and a construction, and furthermore a proper operation thereof requires a considerably greater monitored employee involvement as such a proper operation is dependent on an employee goodwill and requires from an employee to do a greater number of operations for a proper registration of an ingoing or an outgoing episodes.

THE OBJECT OF THE INVENTION

In view of the above, the object of the present invention is to provide a method and a system for an automatic monitoring of attendance of subjects inside a predetermined monitored area that would be relatively simple and from one side would require practically no special operations to be done by the monitored subject, and from the other side would feature a high resistance against attempts at deception thereof by a simulation of a given subject attendance in the monitored area, wherein such attempts would be detected in an automatic manner without any necessity of a manual data analysis.

SUMMARY OF THE INVENTION

According to the present invention there is provided a method for automatic monitoring of attendance of subjects inside a predetermined monitored area as described in the outset characterized in that the step a) additionally comprises transmitting in said notification messages by the wireless transmitters of the identification modules individual motion signals (Ims) representing a motion of a given identification module and obtained using an output signal of a motion sensor, preferably an accelerator, of a given identification module; and the step c) additionally comprises determining by the computation-decision unit a given subject attendance status of an "absent" value within the monitored area in a case of: indicating for a predetermined time period by the individual motion signal for a motionless status of an identification module assigned to the given subject.

In the preferred embodiments of the method according to the present invention the step a) comprises attributing time stamps to the signals comprised in said notification message, wherein time stamps are generated on the basis of the identification modules real time clocks synchronized with each other, preferably by means of a real time clock connected to the computation-decision unit, and the step c) comprises determining by the computation-decision unit a given individual subject attendance status of an "absent" or "abnormal" value within the monitored area additionally in a case of: an occurrence for a predetermined time period a predetermined degree of a similarity between a variability course of an individual motion signal of a identification module assigned to the subject and a variability course of an individual motion signal of a different identification module assigned to a different subject.

In other preferred embodiments of the method according to the present invention the step c) comprises determining by the computation-decision unit a given individual subject attendance status of an "absent" or "abnormal" value within the monitored area additionally in a case of: a lack of an occurrence for a predetermined time period a predetermined degree of a similarity between a variability course of an individual motion signal of an identification module assigned to the subject in a given time period and a reference standard variability course of an individual motion signal of the identification module assigned to said subject for the time period corresponding to the given time period.

In yet another advantageous embodiments of the method according to the present invention the step c) comprises determining by the computation-decision unit a given individual subject attendance status of an "absent" or "abnormal" value within the monitored area additionally in a case of: an occurrence of a predetermined degree of a similarity between a variability course of an individual motion signal of an identification module assigned to the subject for the predetermined current time period and a variability course of an individual motion signal of the same identification module during the previous time periods corresponding to the predetermined current time period.

According to the present invention the individual motion signal preferably comprises a number of motion episodes that occurred during a given time unit, and a time span representing the overall time of motion during a given time unit, and a time stamp.

Said determinations of the similarity degrees between the defined variability courses of the indicated signals are advantageously realized using a Pearson correlation.

According to the present invention it is preferable if in the step c) the computation-decision unit determines an occurrence of an ingoing/outgoing of a subject into/out of the monitored area on the basis of the current and preceding attendance statuses, wherein an ingoing occurrence is determined in a case of a change of the preceding attendance status of an "absent" or "abnormal" value into the current attendance status of a "present" value, whereas an outgoing occurrence is determined in a case of a change of the preceding attendance status of "present" value into the current attendance status of an "absent" or "abnormal" value.

In the preferred embodiments of the present invention the step a) additionally comprises transmitting, in said notification messages by said transmitters of the identification modules, an individual environmental condition parameter signal representing environmental conditions of a given identification module and obtained using an output signal of an environmental condition parameter sensor of the module, preferably a thermometer and/or a light meter and/or a noise meter and/or a hydrometer and/or a pressure meter, and the step c) comprises determining by the computation-decision unit a given individual subject attendance status of an "absent" or "abnormal" value within the monitored area additionally in a case of: an additional simultaneous occurrence for a predetermined time period a predetermined degree of a similarity between a variability course of an individual environmental condition parameter signal of a given identification module assigned to the subject and a variability course of an individual environmental condition parameter signal of an identification module assigned to a different subject.

According to the present invention the step b) preferably comprises additionally determining by the base receiver parameters of a transmission between a transmitter of an identification module and this base receiver, in particular a signal strength and/or a signal quality and/or a distance between the transmitter of the identification module and the base receiver; generating on the basis of the transmission parameters an individual transmission parameter signal and comprising this generated signal into the notification message transmitted to the computation-decision unit, whereas the step c) comprises determining by the computation-decision unit a given individual subject attendance status of an "absent" or "abnormal" value within the monitored area additionally in a case of: an additional simultaneous occurrence for a predetermined time period a predetermined degree of a similarity between a variability course of an individual transmission parameter signal of a given identification module assigned to the subject and a variability course of an individual transmission parameter signal (Itps) of an identification module assigned to a different subject.

Furthermore the method according to the present invention preferably comprises an additional step e) of transmitting, by the base receiver connected to the computation-decision unit, confirmation messages confirming notification message receptions, preferably confirmation messages comprising information from a memory assigned to the subject assigned to a given identification module, wherein the information is related to the attendance statuses of the subject, ingoing/outgoing occurrence moments and with the remaining working time, and/or the computation-decision unit requests for transmitting from a given identification module an attendance confirmation signal and/or the signal of the ingoing/outgoing occurrence type, and receiving by a wireless receiver of the identification module located within the monitored area a confirmation message, and preferably making available the information and/or requests comprised in a confirmation message by the output device of a user interface of an identification module; whereas the step a) additionally comprises including in the notification message a attendance confirmation signal and/or an ingoing/outgoing occurrence type signal generated by means of output devices of a user interface of the identification module.

Finally, in the preferred realizations, the method according to the present invention comprises an additional preliminary step of producing an information of an optional association of a given subject with other subjects, whereas the step a) comprises attributing time stamps to the signals comprised in the notification message (Nm), wherein time stamps are generated on the basis of the identification modules real time clocks synchronized with each other, preferably by means of a real time clock connected to the computation-decision unit, and the step c) comprises determining by the computation-decision unit an attendance status (As) of a given individual subject associated with other subject additionally on the basis of the information on the association of the given subject with other subjects and determining the given subject attendance status (As) of an "absent" or "abnormal" value within the monitored area additionally in a case of:

a lack of an occurrence for a predetermined time period a predetermined degree of a similarity between a variability course of an individual motion signal (Ims) of a identification module assigned to the subject and a variability course of an individual motion signal (Ims) of a different identification module assigned to a different subject associated with the given subject.

An association between subjects according to the present invention means an occurrence/establishment for these subject a requirement of a physical connection of these subjects with each other. The subjects associated with each other may be for example some employees forming a team that have to simultaneously and collaboratively perform a given work, or for example an employee and a personal safety means (for example a safety helmet) that is required to be utilized by the employee.

According to the present invention there is also provided a system for automatic monitoring of attendance of subjects within a predetermined monitored area comprising:

1) at least one identification module assigned and attachable to a given subject the attendance of which is to be monitored, comprising at least: an internal memory, in which the identification data of the identification module are stored; and a wireless transmitter periodically transmitting a notification message comprising an individual attendance signal comprising the identification data of the identification module, and 2) a wireless base receiver wirelessly receiving notification messages transmitted by the transmitters of said identification modules located within the predetermined monitored area;

3) a computation-decision unit connected to said base receiver and determining attendance statuses of individual subjects within the monitored area on the basis of notification messages received by the base receiver from identification modules assigned and attachable to individual subjects, wherein a given subject attendance status of an "absent" value is determined in a case of; a lack of a reception of an individual attendance signal of the identification module assigned to the given subject for a predetermined time period;

4) a memory connected to the computation-decision unit and comprising records assigned to individual subjects in which the unit registers information related with attendance statuses of individual subjects;

and which is characterized in that each identification module additionally comprises a motion sensor, preferably accelerometer, and the notification message of the transmitter of the identification module comprises also an individual motion signal representing the identification module motion and obtained using an output signal of the motion sensor of the identification module, whereas the computation-decision unit determines an individual subject attendance status of an "absent" value within the monitored area in a case of: indicating for a predetermined time period by the individual motion signal for a motionless status of an identification module assigned to the given subject.

The preferred embodiments of the system according to the present invention comprise at least two identification modules assigned and attachable to individual subjects the attendance of which is to be monitored, wherein the identification modules comprise real time clock synchronized with each other, preferably by means of a real time clock connected to the computation-decision unit, and the computation-decision unit determines an individual subject attendance status of an "absent" or "abnormal" value within the monitored area additionally in a case of: an occurrence for a predetermined time period a predetermined degree of a similarity between a variability course of an individual motion signal of a identification module assigned to the subject and a variability course of an individual motion signal of a different identification module assigned to a different subject.

In further preferred embodiments of the system according to the present invention the computation-decision unit determines an individual subject attendance status of an "absent" or "abnormal" value within the monitored area additionally in a case of: a lack of an occurrence for a predetermined time period a predetermined degree of a similarity between a variability course of an individual motion signal of an identification module assigned to the subject in a given time period and a reference standard variability course of an individual motion signal of the identification module assigned to said subject for the time period corresponding to the given time period.

In yet another preferred embodiments of the system according to the present invention the computation-decision unit determines an individual subject attendance status of an "absent" or "abnormal" value within the monitored area additionally in a case of: an occurrence of the predetermined degree of a similarity between a variability course of an individual motion signal of an identification module assigned to the subject for the predetermined current time period and a variability course of an individual motion signal of the same identification module during the previous time periods corresponding to the predetermined current time period.

The individual motion signal comprises preferably a number of motion occurrences during a given time unit, and a time span representing the overall time of motion during a given time unit, and a time stamp.

In the preferred embodiments of the present invention the identification module comprises an environmental condition parameter sensor, in particular a thermometer and/or a light meter and/or a noise meter and/or a hydrometer and/or a pressure meter, and the notification message additionally comprises an individual environmental condition parameter signal, wherein environmental condition parameters comprises in particular temperature, light intensity, noise level, humidity, pressure, and the computation-decision unit determines an individual subject attendance status of an "absent" or "abnormal" value within the monitored area additionally in a case of: an additional simultaneous occurrence for a predetermined time period a predetermined degree of a similarity between a variability course of an individual environmental condition parameter signal of a given identification module assigned to the subject and a variability course of an individual environmental condition parameter signal of an identification module assigned to a different subject.

According to the present invention it is furthermore preferable if the base receiver determines parameters of a transmission between a transmitter of an identification module and this base receiver, the parameters comprising in particular a signal strength and/or a signal quality and/or a distance between the identification module transmitter and the base receiver, and generates on the basis of the transmission parameters an individual transmission parameter signal transmitted to the computation-decision unit; and the computation-decision unit determines an individual subject attendance status of an "absent" or "abnormal" value within the monitored area additionally in a case of: an additional simultaneous occurrence for a predetermined time period a predetermined degree of a similarity between a variability course of an individual transmission parameter signal of a given identification module assigned to the subject and a variability course of an individual transmission parameter signal of an identification module assigned to a different subject.

Furthermore the system according to the present invention preferably additionally comprises 5) a wireless base transmitter connected to the computation-decision unit and transmitting confirmation messages confirming receptions of notification messages, preferably confirmation messages comprising information from the memory assigned to the subject assigned to a given identification module, the information being related with the attendance statuses of the subject, with ingoing/outgoing occurrence moments and with the remaining working time, and/or transmitting the computation-decision unit requests for transmitting from a given identification module an attendance confirmation signal and/or the signal of the ingoing/outgoing occurrence type, wherein the identification module preferably comprises a wireless receiver receiving, within the monitored area, confirmation messages transmitted by the base transmitter, and a user interface comprising an output device, preferably comprising a display, making available the information and/or requests comprised in a confirmation message and an output devices, preferably comprising a touch matrix and/or buttons, for generating an attendance confirmation signal and/or an ingoing/outgoing occurrence type signal.

Finally in preferred embodiments the system according to the present invention preferably comprises at least two identification modules assigned and attachable to given particular subjects the attendance of which is to be monitored, wherein the identification modules comprise real time clocks synchronized with each other, preferably by means of a real time clock connected to the computation-decision unit, and the memory connected to the computation-decision unit additionally comprises records attributed to particular subjects in which information on associations between given subjects are registered, whereas the computation-decision unit determines an individual subject attendance status (As) of an "absent" or "abnormal" value within the monitored area additionally based on the information from the memory on the association of the given subject with the other subjects and in a case of:

a lack of an occurrence for a predetermined time period a predetermined degree of a similarity between a variability course of an individual motion signal (Ims) of an identification module assigned to the given subject and a variability course of an individual motion signal (Ims) of a different identification module assigned to a different subject associated with the given subject.

The solutions proposed according to the present invention enable for automatic monitoring of attendance of various subjects within the monitored area without the necessity of performing by these subjects any activities purposed for a registration of ingoing/outgoing episodes respectively into/out of the monitored area or for a registration of a presence state within the monitored area. Attendance monitoring is in the solutions according to the present invention independent from the will of a subject, what has a great importance in particular in a case where the solutions are used for monitoring working time of employees. The solutions according to the present invention enable for resigning from an installation of individual entrance/exit terminals, as the solutions determine crossing of the circumference of the monitored area in any arbitrary point thereof. Furthermore the solutions of the present invention determine the direction of this crossing in a manner differentiating an ingoing episode from an outgoing episode.

The solutions of the present invention feature high resistance against attempts of simulating a subject attendance within the monitored area. In particular the present invention enables for an automatic detecting an attendance simulation of a subject assigned to a particular identification module by:

carrying in an identification module into the monitored area, leaving the module within the monitored area, and subsequently coming out from the monitored area by the subject, the attendance of which are to be monitored, without the left module;

carrying in a number of identification modules into the monitored area by one subject, and possibly further moving by this subject over the monitored area carrying a number of modules; and exchanging of identification modules between subjects.

Furthermore the solutions according to the present invention enable for monitoring an attendance of a given subject in a state of a connection thereof with other subject in the monitored area. Such a variant of the present invention has a significant importance in cases where the solutions of the present invention are employed for monitoring of work of predefined groups of employees, and furthermore this variant may find use for monitoring a usage of particular personal means or devices by employees, such as for example personal safety means. Furthermore in a case of determining a lack of a predefined degree of a similarity between variability courses of individual motion signals of the subjects associated with each other, an appropriate information indicating for a lack of a required physical connection between these subjects may be transmitted to the identification modules assigned to these subjects.

BRIEF DESCRIPTION OF THE DRAWINGS

The invention is illustrated below with reference to the preferred embodiments thereof that should not be considered in any way as limitative and with reference to the attached drawings on which.

DESCRIPTION OF THE INVENTION EMBODIMENTS

Figure 1:
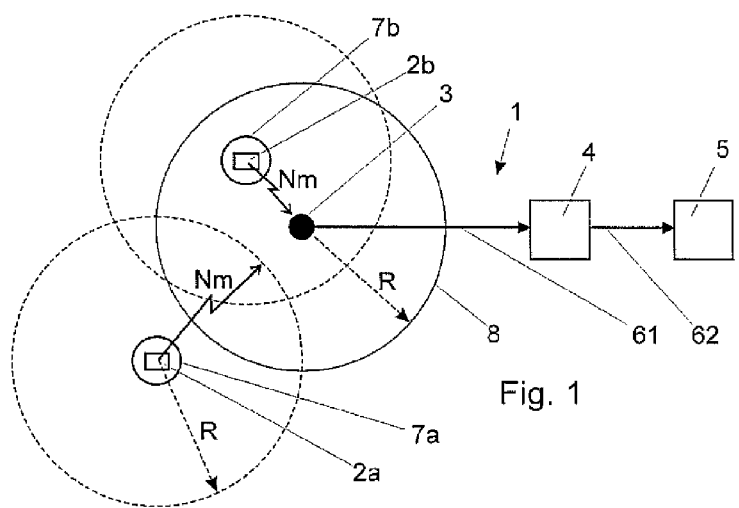
FIGS. 1, 2 present schematically exemplary systems according to the present invention.
Figure 2:
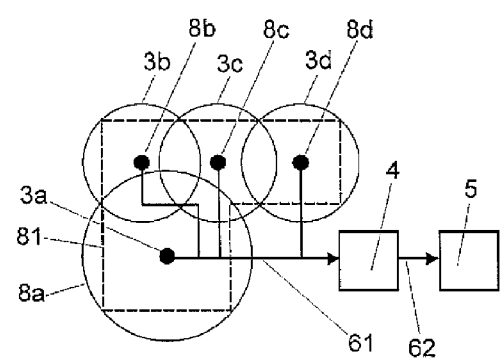
Figure 3:
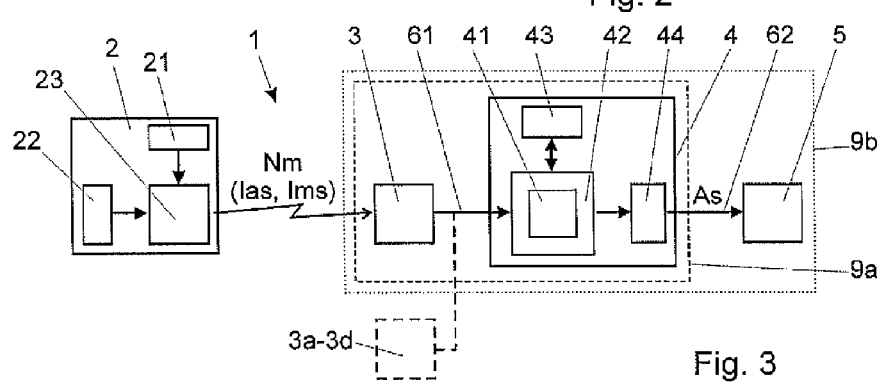
FIG. 3 presents a block scheme of the first embodiment of the system according to the present invention.

FIGS. 1-3 illustrate schematically a structure of an exemplary system 1 for automatic monitoring of attendance of subjects according to the present invention.

The system 1 comprises an identification module 2, a wireless base receiver 3, a computation-decision unit 4 and a memory 5.

The base receiver 3, the computation-decision unit 4 and the memory 5 are fixedly and communicatively connected with each other by means of communication links 61, 62, which in a particular case may constitute a single communication network.

The identification module 2 is assigned to and connected to the subject 7, the attendance of which is to be monitored, and comprises an internal memory 21 in which the identification data of this identification module 2 are stored, a motion sensor in a form of an accelerometer 22 of the MEMS type generating signals representing accelerations of the identification module 2 in three axes, and a wireless transmitter 23 connected with the memory 21 and the sensor 22 and periodically transmitting notification messages Nm comprising an individual attendance signal Ias comprising the identification data stored in the internal memory 21 of this identification module 2 and an individual motion signal Ims representing the motion of this identification module 2.

The identification module 2 obviously also comprises an autonomous power source (not shown in the drawings) such as for example a battery, that supplies electrical energy to the components of the module.

The subject 7 may be for example a person (for example an employee), an article, a vehicle or an animal.

The transmitter 23 periodically transmits the messages Nm in a wireless and omnidirectional manner, wherein in the radius R around the transmitter 23 the signal parameters of the transmitted messages Nm are sufficient to enable for receiving the messages by the base receiver 3. Thus in a case where the module 2a attached to the subject 7 is located in a distance greater than the radius R from the base terminal 3, the notification messages Nm transmitted by the transmitter 23 of this identification module 2a shall not be received and detected by the receiver 2a and the computation-decision unit 4 shall not determine a presence of the module 2a and thus also an attendance of the subject 7a in the monitored area 8. The detection of the identification module 2b shall be possible only for the identification module 2b of the subject 7b that is positioned inside the circle of the radius R around the base receiver 3. In this manner the area 8 monitored by the base receiver 3 has a form of the circle of the radius R. An adjustment of a radius R of the monitored area 8 may be realized by providing a possibility of regulating a transmission power of the transmitters 23 of identification modules 2 and/or of regulating a sensitivity of the base receivers 3.

In a case where the monitored area 81 does not have a circle geometry, instead of one base receiver covering by its whole circle area the whole monitored area, it may be advantageous to employ a number of base receivers 3a-3d, the smaller monitored areas 8a-8d of which collectively cover the area 81 on which an attendance monitoring is required (FIG. 2). In such a case all base receivers 3a-3d obviously have to be connected with the computation-decision unit 4 by means of a communication network 61. The graphical representation of a communication connection between the receivers 3a-3d and the computation-decision unit 4 as depicted in FIG. 2, is to be regarded as having only an illustrative character. For a skilled technician a number of various solutions enabling for a realization of the communication network 61 is available from the prior art. In particular, individual direct connections of each receiver 3a-3d to the computation-decision unit 4 are not necessary. The communication network 61 may be for example a wireless mesh network in which only the receiver 3a is directly connected to the computation-decision unit 4, and the remaining receivers 3b-3d serve only as routers transferring further notification messages Nm without any substantial processing thereof. An exemplary mesh topology may be a system in which all receivers 3a-3d are connected with each other in a peer-to-peer configuration or a system in which all receivers 3a-3d are connected in a chain. Generally a connection system between the receivers 3a-3d is dependent on their spatial arrangement, wherein in each such a system the notification messages Nm from all receivers are finally delivered to the receiver 3a which transmits them further to the computation-decision unit 4.

The base receiver 3 is any arbitrary receiver known from the prior art conformable for the type of a wireless transmission of the messages Nm by the transmitters 23 of the identification modules 2. In particular a communication between the transmitters 23 of the identification modules 22 and the base receivers 3 may be a radio communication.

The notification messages Ms may be advantageously transmitted in an encrypted form using a secret known by the transmitter 23/the identification module 2 and known by the base receiver 23 or the computation-decision unit 4, which after a reception thereof are able to properly decrypt the message Nm.

The computation-decision unit 4 comprises in a general case a processor 41 carrying out predetermined arithmetical-logical operations on the signals (the messages Nm) provided by the base receivers 3 connected to this unit 4. In particular the unit 4 may comprise a microcontroller 42 optionally cooperating with a RAM memory 43 and a communication interface 44 enabling for a communication between the unit 4 and the memory 5. In a particular case, the memory 5 may obviously constitute a part of the microcontroller 42 RAM memory 43.

In a general case the memory 5 has a form of a database comprising records assigned to particular subjects 7 in which the computation-decision unit 4 periodically stores information on attendance statuses As of individual subjects 7, that are determined based on the notification messages Nm from the identification modules 2 assigned to the subjects 7. The statuses As are provided with time stamps. An access to the database enables for monitoring a time course of attendance statues As of each subject 7 in the monitored area 8. The record of each subject 7 in the memory 5 contains identification data of the identification module 2 assigned to this given subject. Thanks to that the attendance status of the module 2 in the monitored area 8 is automatically rewritten into the attendance status As of the subject 7 assigned to the given identification module 2.

The base receiver 3 and the computation-decision unit 4 (and optionally also the memory 5) may be integrated with each other in a form of a single base unit 9a (optionally 9b). Such base units 9a (9b) may be obviously employed also in a case of a number of overlapping monitoring subareas 8a-8d (cf. FIG. 2) collectively forming the area 81 on which subject attendance is to be monitored. In a case of using the units 9a, these units may work independently from each other and transmit attendance statuses AS determined individually by them to the common master external database 5.

It is also possible to implement an intercommunication between a number of the base stations 9a, 9b for example by means of a radio communication network of a mesh topology. Then only one of the base stations has its computation-decision unit 4 connected to the database 5, and the remaining base units use only their receivers 3 and transmitters (not shown in the drawing) controlled appropriately by their computation-decision units in order to appropriately transmit signals between them. Furthermore in such a case it is possible to utilize a cooperation of such base stations 9a, 9b for determining a localization of an identification module on the monitored area with using any arbitrary triangulation method.

Figure 4:
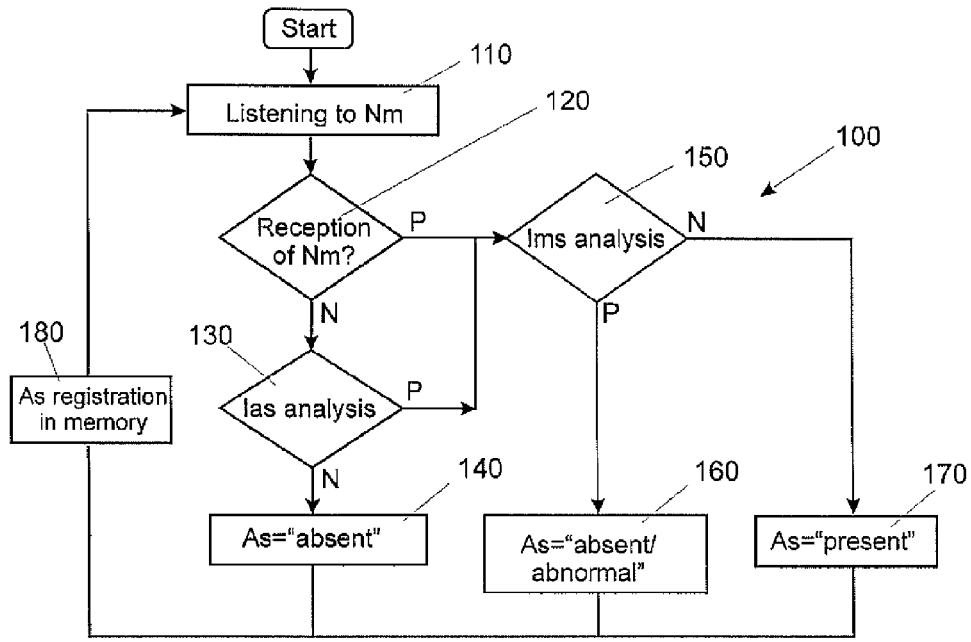
FIGS. 4-6 present block diagrams of the first and second embodiments of the method according to the present invention.
Figure 5:
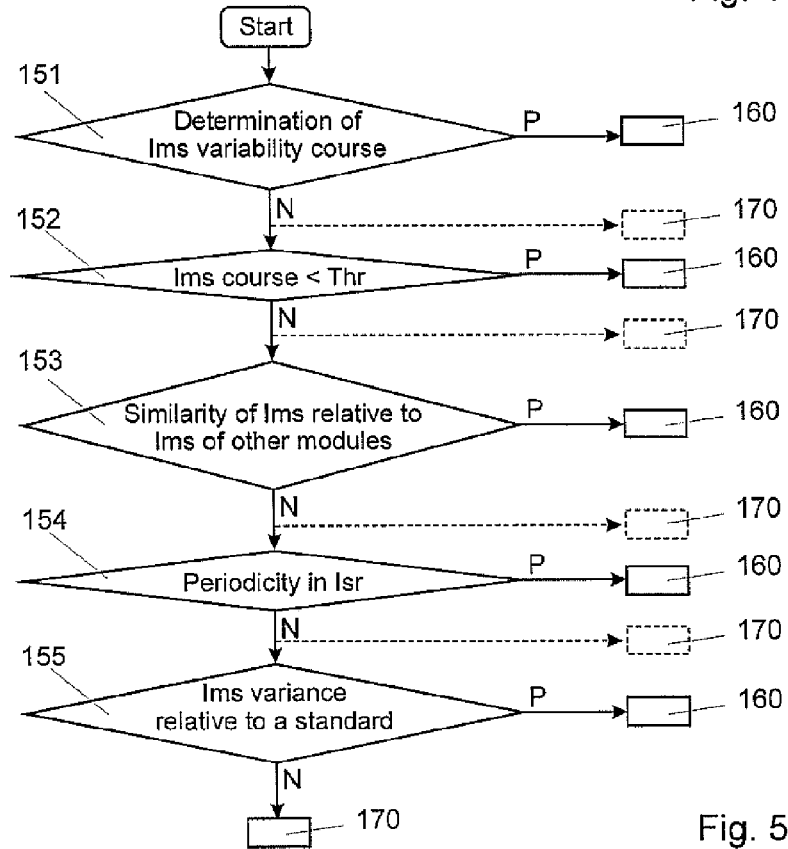

FIGS. 4 and 5 present an exemplary method 100 for an automatic monitoring of attendance of subjects within a predetermined monitored area according to the present invention that may be realized in the system 1.

The base receiver 3 (or in a general case a group of base receivers) monitors the monitored area 8 by continuous listening to notification messages Nm from the transmitters 23 of identification modules 2 (the block 110) and each time after a reception of a notification message Nm the receiver 3 transmits the message to the computation-decision unit 4. For each subject the computation-decision unit 4 periodically checks a status of a reception of a notification message Nm originating from the identification module 2 assigned to the given subject 7 (the block 120). In a case of a lack of a message Nm reception (the negative output N of the block 120), the computation-decision unit 4 runs to a realization of the analysis of a time variability of individual attendance signals Ias (the block 130) of this identification module 7. If in the result of this analysis, the computation-decision unit 4 determines that the signal Ias has not been received during the predetermined time period (the negative output N of the block 130) then the unit 4 determines the attendance status As of this given subject 7 assigned to this module 2 as an "absent" value (the block 140). Otherwise (the positive output P of the block 130) the computation-decision unit 4 runs to a realization of an analysis of a time variability of individual motion signals Ims (the block 150) of this identification module 2, in the result of which the attendance status As may be determined as an "absent" or "abnormal" value (the positive output P of the block 150; the block 160), or in a case of not determining an "absent" or "abnormal" value (the negative output N of the block 150) the presence of a given subject in the monitored area is confirmed by determining the attendance status As as a "present" value (the block 170).

The present invention enables for a distinction of a state of a real physical absence of a given identification module in the monitored area from a state of an "assumed" physical absence of the subject assigned to a given identification module that physically is present in the monitored area but is characterized by an abnormal course of signal Ims variability that suggests a presence simulation by leaving the transmitter in the monitored area, carrying an identification module on a subject that is not assigned to this given identification module (in particular on a subject that is also carrying its own identification module) or fixing an identification module in the monitored area on an element performing a periodic movement.

In some cases it may be advantageous to distinguish these two absence statuses and then the attendance status As in a case of a real physical absence of a module in the monitored area is determined as an "absent" value, and in a case of an "assumed" absence of a subject in the monitored area is determined as an "abnormal" value.

Such a functionality may be advantageous in a case of using the solutions according to the present invention for a working time registration, in which for example carrying two identification modules by one employee shall be detected by the system according to the present invention by without an univocal determination which of the two employee assigned to these modules is actually absent.

In other realizations both of these cases may not be discriminated and for both of them an "absent" attendance status may be determined.

In a general case an analysis of an individual motion signal Ims schematically illustrated in a block diagram of FIG. 5 comprises initially determining a time variability course of signals Ims of a predetermined number of the last consecutive notification messages Nm (thus for a predetermined time period) received from a given identification module (the block 151), and subsequently determining whether the course does not exceed a predetermined threshold value Thr (the block 152). The signal Ims value is proportional to an intensity of an identification module motion. A variability course of a signal Ims not exceeding a predetermined threshold value Thr indicates a motionless state of an identification module. If such a motionless state is maintained for a longer time period it may evidence a detachment of an identification module from the subject assigned to the module, and thus the presence of the subject on the monitored area may not be confirmed. Therefore in such a case (the positive output P of the block 152) the computation-decision unit directly determines the attendance status As of an "absent" or "abnormal" value (the block 160). Otherwise the computation-decision unit 4 runs to the subsequent optional steps 153-155 of an analysis 150 of the signal Ims variability course.

The steps 153-155 are optional in this sense that the solutions according to the present invention may comprise none of these steps, may comprises only one of these steps, or may comprise any arbitrary combination of any arbitrary number of these steps 153-155 presented in FIG. 5.

In particular the further analysis of the signal Ims variability course may comprises a sequence of the steps 153-155 shown in FIG. 5.

In the step 153 the unit 4 compares a similarity of the variability course of signals Ims determined in the step 151 and variability courses of signals Ims of different identification modules corresponding to each other in respect of time period. This similarity may be for example determined using a correlation, such as for example Pearson correlation. A determination by the unit 4 of a given, appropriately high, degree of a similarity between a variability course of signals Ims of a given module and a corresponding variability course of a different module indicates that both the modules are attached to the same subject that is simulating the presence of these two subjects assigned to these modules. Therefore in a case of a positive evaluation of this similarity the unit 4 determines the attendance status As of an "absent" or "abnormal" value (the block 160).

Whereas in a case of a negative evaluation of this similarity as too low and insignificant, the transition to the next step 154 is realized, in which step the unit 4 determines an occurrence of a periodicity in a variability course of signal Ims by determining a similarity (for example with using a correlation, for example Pearson correlation) between the current variability course of signals Ims determined in the step 151 and the corresponding variability courses of signals Ims of the same module for the previous time periods. In this analysis, variability courses of signal Ims are compared for relatively short time periods in a comparison with a longtime standard motion signals comprising variability courses of signal Ims for relatively long time periods.

The determination by the unit 4 a particular degree of a similarity between such variability course evidences attaching a given module on any element being in a periodic motion that is to simulate a movement of a subject assigned to the module over the monitored area. Therefore in a case of a positive evaluation of a periodicity occurrence in a variability course of signal Ims, the unit 4 determines the attendance status as an "absent" or "abnormal" value (the block 160). In solutions provided with an implementation of a functionality of determining a distance between an identification module and a base receiver, a determination of a motion periodicity may be additionally supplemented with a requisite of a lack of a change of a distance between a given module and a base station (for a vertical periodic motion) or a periodic character of a change of such a distance.

In a case of the negative evaluation of a periodicity occurrence of this similarity, a transition to the next step 155 is realized, in which step the unit 4 determines a variance (for example with using a correlation, for example Pearson correlation) between a variability course of signal Ims and a (substantially longtime) reference standard of a variation course of a signal Ims for the same module determined for a time period for which the current variability course of signal Ims has been determined. This analysis is advantageous for subjects characterised by given reference standards of variability courses of signals Ims in certain specific periods of time, for example for subjects such as security guards the duty of whose is to make patrols in predetermined hours. In a case of a determination of a particular degree of a variance between signal Ims variability courses that are being compared, the unit 4 determines the attendance status as an "absent" or "abnormal" value (the block 160).

Optionally after obtaining the negative result of the step 152, 153 or 154, instead of a transition to the subsequent step 153/154/155, the computation-decision unit 4 may directly determine an attendance status as a "present" value (the block 170), as indicated in FIG. 5 with dashed lines.

In the final step 180 of the method 100, the computation-decision unit 4 registers the attendance status As determined in the block 140, 160 or 170 together with a time stamp attributed thereto to the record of a given subject in the memory that is assigned to the identification module for which this attendance status As has been determined.

Figure 6:
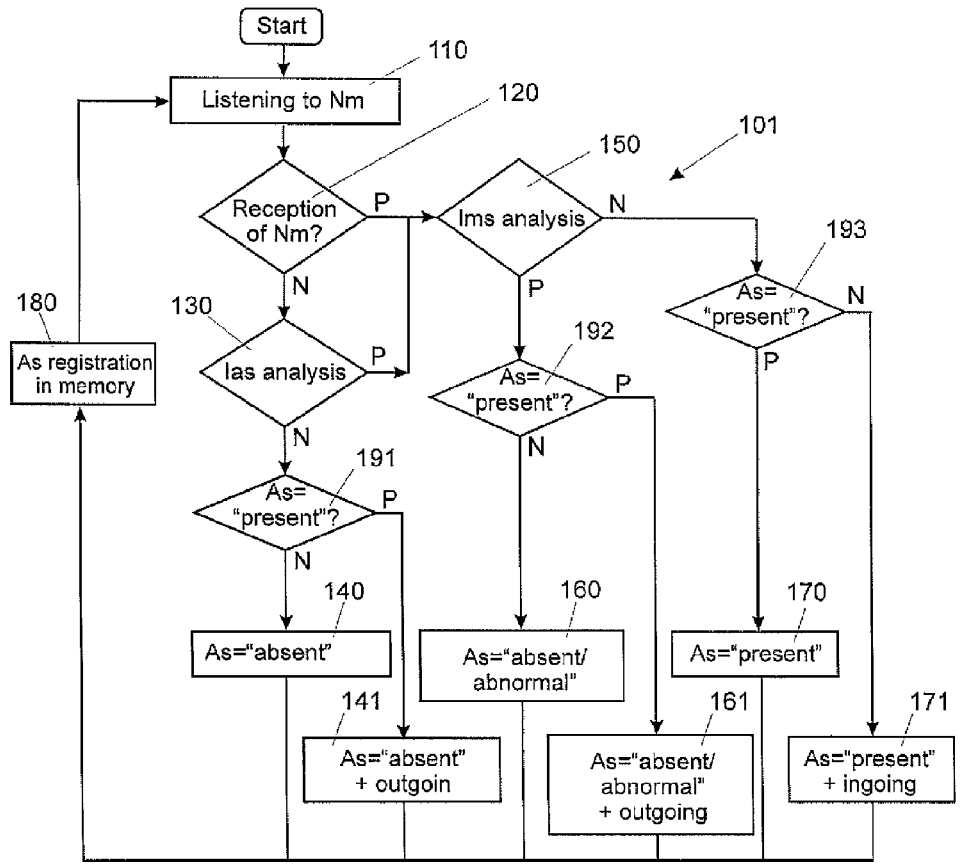

FIG. 6 presents another exemplary method 101 of an automatic monitoring of attendance of subjects inside a predetermined monitored area according to the present invention that may be realized in the system 1. The method 101 is the method 100 of FIGS. 4-5 provided with an additional functionality of an indication of ingoing and outgoing episodes of a subject respectively in and from the monitored area, in a comparison with the method 100, the method 101 comprises three additional steps 191, 192, 193 realized before the final determinations of attendance statuses Aa as an "absent" value in the step 140, as an "absent/abnormal" value in the step 160 and as a "present" value in the step 170. In the additional steps 191-193, depending on the previous attendance status As, the computation-decision unit determines an occurrence of ingoing and outgoing episodes of a subject respectively in and out from the monitored area. In cases where in a combination with a negative Ias analysis or with a positive Ims analysis suggesting an absence of a subject in the monitored area, the previous status As has been determined as a "present" value (the positive outputs P of the blocks 191, 192), the computation-decision unit determines an occurrence of an outgoing episode of a given subject from the monitored area and simultaneously gives an "absent/abnormal" value to the attendance status As of this subject (the blocks 141, 161). Whereas in a case where in a combination with a negative Ims analysis suggesting a presence of a given subject in the monitored area, the previous status As has not been determined as a "present" value (the negative output N of the block 193), the computation-decision unit determines an occurrence of an ingoing episode of the given subject into the monitored area and obviously simultaneously gives a "present" value to the attendance status As of this subject (the blocks 171).

Figure 7:
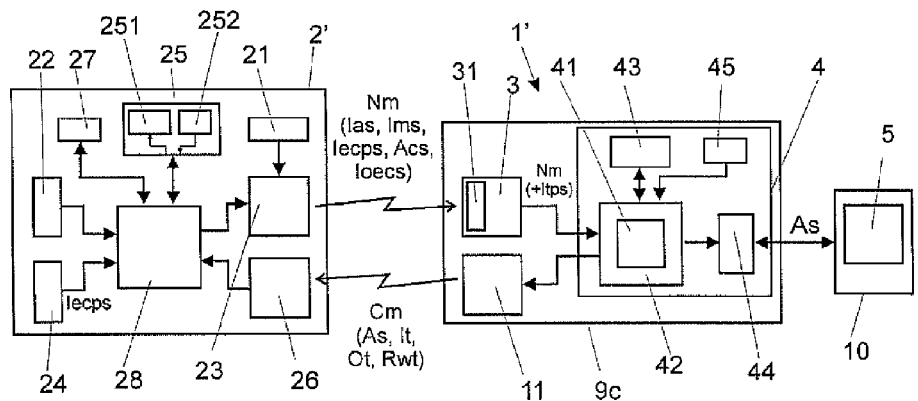
FIG. 7 presents a block scheme of the second embodiment of the system according to the present invention.

FIG. 7 presents a block scheme of another embodiment of a system 1' for an automatic monitoring of attendance of subjects within a predetermined monitored area according to the present invention. In a comparison with the module 2 of the system 1 of FIG. 3, the identification module 2' of the system 1' additionally comprises a set of environmental condition sensors 24, a user interface 25, a wireless receiver 26, a real time clock (RTC) 27 and a microcontroller 28 that controls an operation of the whole module 2'.

The sensor set 24 comprises one or more sensors, such as for example a thermometer, a light meter, a noise level meter, a hygrometer or a pressure gauge. The output signals of such sensors, representing parameters of the environment surrounding the module 2', are transmitted to the microcontroller 28 that on the basis of these signals produces an individual environmental condition parameter signal Iecps and inserts this signal Iecps into the notification message Nm transmitted by means of the transmitter 23. In a general case, the signal Iecps comprises values of environmental parameters of the identification module 2', such as for example temperature, light level, noise level, humidity or pressure.

The system 1' comprises a base unit 9c of the construction similar to the construction of the unit 9a of FIG. 3, wherein the unit 9c additionally comprises a real time clock (RTC) 45, a wireless base transmitter 11 and a base receiver 3 provided with the system 31 of determining parameters of the communication transmission between the transmitter and the receiver. In a case where the communication transmission is a radio communication transmission, after a reception of a notification message Nm by the receiver 3, the system 31 in a manner known from the prior art determines the parameters of a radio transmission, such as for example a received signal strength indication (RSSI), a link quality indicator (LQI) evaluated based on a number of data transmission errors that has to be corrected by the receiver 2, or a transmission distance between the transmitter of an identification module and a receiver consisting for example in a measurement of phase shifts between radio signals; on the basis of such parameters the receiver 31 generates an individual transmission parameter signal Itps and inserts this signal Itps into the notification message Nm transmitted to the computation-decision unit 4.

In the system 1' it is obviously possible to realize methods for an automatic attendance monitoring 100-101 depicted in FIGS. 4-6, that are supplemented with the steps of an analysis of a similarity between variability courses of signals Iecps/Itps that are analogical relative to the steps 150-155 of the analysis of a similarity between variability of signals Ims of the methods 100-101, wherein such an analysis of variability of time courses of signals Iecps/Itps provides additional supplementary criterions taken into consideration by the computation-decision unit 4 during a determination of an attendance status As of a given subject.

In particular an analysis of variability of time courses of signals Iecps/Itps may be used for increasing a reliability of a determination of an absence determined on the basis of an analysis of a variability of time courses of signals Ims.

For example the computation-decision unit 4 may determine an attendance status As of "absent" or "abnormal" value in a case of an additional simultaneous occurrence of a predefined degree of a similarity between a variability course of signals Iecps of an identification module assigned to a given subject and a variability course of signals Iecps of the identification module assigned to a different subject during a predefined time period, and/or in a case of an additional simultaneous occurrence of a predefined degree of a similarity between a variability course of signals Itps of an identification module assigned to a given subject and a variability course of signals Itps of an identification module assigned to a different subject during a predefined time period.

An employment of the microcontroller 28 enables for a realization of a certain preliminary processing of signals from the motion sensor 22 and/or the environmental condition parameter sensors 24 on the level of an identification module. In such a case, a transmission of raw data from a motion sensor directly to a computation-decision unit 4 is not necessary. Thanks to that, it is possible to limit an amount of information that are necessary to be transmitted to the base receivers 3, a frequency of transmissions of notification messages to the base receivers 3 or a required processing capacity of the computation-decision unit 4.

For example using a two-state output of a motion sensor (for example the output INT of commercially available accelerometers of the MEMS type) featuring the change from the low state to the high state (0→1) at the beginning of a motion and the change from the high state to the low state (1→0) in a case of a lack of a motion for a predefined time period, the microcontroller 28 may generate a signal Ims comprising a set of predefined information characterising a given motion during a predefined time unit Tn, that for example comprises a number of episodes Ir of motion occurrences during the time Tn and a part Rp of the time unit Tn during which the motion has been occurring. Such an information set comprises for example pairs of data Ir and Rp for a predefined number Q of consecutive time units Tn, thus a transmission of a signal Ims occurs periodically at intervals amounting Q×Tn.

Such data sets of Tn and Rp in form of two-dimensional arrays together with time stamps attributed to them with employment of the real time clock 27 are transmitted in notification messages Nm to the computation-decision unit 4, which during a realization of the step 151 (FIG. 5) of determination of courses of signals Ims arranges these information sets from particular signals Ims and forms from these signals a multidimensional array, which in rows comprises time units and in columns comprises data Ir and Rp from individual identification modules 2.

Determining a similarity of variability courses of signals Ims realized however by the computation-decision unit 4 may in such a case comprise a determination of Pearson linear correlation coefficients between series of data Ir and Rp of a given module and corresponding series of Ir and Rp of different modules. The coefficients are evaluated separately for data Ir and data Rp for all pairs of a given module with each one of the remaining modules. If both of these two correlation coefficients exceed predefined threshold values selected from the range from 0 to 1, then the computation-decision unit 4 determines that the variability courses of signals Ims are similar enough for an occurrence of a reasonable probability that both identification modules are being carried by the same subject and determines the attendance status As as an "absent/abnormal" value.

Instead of a separated comparison of correlation coefficients for data Ir and Rp, it may be advantageous to combine results of comparisons from a correlation (for example Pearson correlation as indicated above) for these data using a weighted average, wherein in particular it may be advantageous for the weights for motion time data Rp to be greater than the weights for data Ir of a number of motion episodes. Furthermore in certain cases it may be preferable additionally to combine results of comparisons from correlations for different data, such as for example environmental condition parameters comprised in signal Iecps or transmission parameters comprised in signal Itps as indicated above, by means of a one common weighted average. In such a case it is advantageous that the smallest weights are attributed to environmental condition parameters, the greater weights are attributed to transmission parameters and the greatest weights are attributed to motion parameters.

The real time clocks 27 of all identification modules 2 in the system 1' are synchronized with the real time clock 45 of the base unit 9c (and therefore the clocks 27 are also synchronized with each other) during each transmission of a notification message Nm with using any arbitrary, in particular known for a skilled technician from the prior art, synchronization algorithm. Thanks to that a more precise analysis of signals Ims may be carried out in the step 150 of FIG. 4.

The memory 5 in a form of a database constitutes in the system 1' a central part of a master computer system 10 that performs a work time registration based on the attendance statuses As determined by the computation-decision unit 4 and provided to the computer system 10 by means of an Ethernet communication network 62.

In addition to information related to attendance statuses, the computer system 10 stores in the database 5 in a record of each subject that is subjected to working time registration, also requirements defined for this subject such as for example a required length of working time period and working hours determining the time period in which the required working time period are to be contained. Based on an access to the record of a given subject, the computer system 10 or the computation-decision unit 4 (with using the network 62) may in turn determine various data on working time records for a given particular subject, such as for example ingoing time (It), outgoing time (Ot) and the remaining working time (Rwt). These various data are made available in the system 1' by means of the wireless base transmitter 11 of the base unit 9c and the wireless receiver 26 and the user interface 25 of the identification module 2'.

The user interface 25 comprises output devices 251 such as for example a display (preferably a bistable display or a LCD display) or a sound signal device enabling for making available to the subject, carrying a module with such an interface, the information concerning records of its working time contained in the database 5 or information generated on the basis of data from the database 5 by the computer system 10 or by the computation-decision unit 4.

The user interface 25 comprises also input devices 252 enabling to a user for introducing data for the microcontroller 28, such as for example buttons or touch-sensitive array of a display.

An employment of a bidirectional communication between the base unit 9c and identification modules 2' enables also for an implementation of a manual mode of attendance in the monitored area that enables for confirming an actual attendance of at least one subject in the monitored area. This mode may comprise transmitting requests of an attendance confirmation to identification modules by the computation-decision unit at random moments of time.

After a transmission of such a request, the computation decision unit runs into a wait state in which during a predefined time period it waits for a reception of an identification module response that has a form of an attendance confirmation signal (Acs) contained in a notification message.

After a reception of such a request, the microcontroller 28 of the module 2' provides to the subject, that is carrying this module, an appropriate information on a reception of this request by means of an appropriate actuation of output devices 251, for example a sound signal device, and waits for a reception of an appropriate signal from the input devices 252 (for example a signal corresponding to a pressing an appropriate button of the user interface 25) that shall start a transmission of an attendance confirmation signal Acs in a notification message Nm to the base unit 4 in a response to its request.

The manual mode may be also used to improve a univocal character of an attendance status determination, for example for a univocal determination of attendance in a case of a detection of a periodicity in the Ims signal variability course, which is only a result of randomness, but not a result of an actual physical absence of a given subject.

In a case of an employment of an access locking means in the monitored area, for example the computer system 10 may also comprise an access control system that controls the state of such locking means. The output devices 252 of the user interface 25 of the module 2' may be in such a system used for formulating requests (for example contained in notification messages Nm) for opening (specified) access locking means that are transmitted by means of the base units 9c to the computer system 10. The computer system 10 may, in a response to such a request, produce a decision on opening particular locking means for example based on an analysis of an attendance status As of a subject assigned to the given identification module that has transmitted a given request, authorizations attributed to a given subject that are stored in the database 5, or information related to a localization of the module that has transmitted a given request.

In a case of an employment of a system for an automatic monitoring of attendance according to the present invention for an implementation of a working time registration system, the input devices 252 of the user interface 25 of the module 2' may be also used for a more precise determination of a character of an ingoing/outgoing episode respectively into/out from the monitored area. This functionality may be for example realized in the mode of transmitting by the unit 4, in a case of determining an occurrence of a subject ingoing/outgoing episode respectively into/out from the monitored area, a request for an indication whether the ingoing/outgoing episode is an official or informal personal episode. In a response to such a request, a given subject using the input means 252 of the interface 25 indicates the character of a given ingoing/outgoing episode by generating an ingoing/outgoing episode character signal (Ioecs) that is contained in a notification message Nm. The indicated character of an ingoing/outgoing episode is subsequently considered by the computer system 10 that controls a working time registration process.

A bidirectional communication between the base unit 9c and the identification modules 2' may be also utilized to implement transmitting by the computation-decision unit 4 individual confirmation messages Icm that confirm a reception of a notification message Nm from a particular identification module 2'.

It is obvious that confirmation messages Cm may comprises various data (such as for example an ingoing hour It, an outgoing hour Ot or the remaining working time Rwt), the request for providing of which introduced by means of the interface 25 has been comprised by the module 2' in the transmitted notification message Nm. After a reception of a confirmation message, the requested data are made accessible by the output devices 251 (such as for example a bistable display) of the interface 25.

Confirmation messages Cm may also comprise information concerning an actual attendance status As of a given module 2' being made accessible by the output devices 25 thereof.

Confirmation messages Cm may also comprise requests for providing by the identification module 2' to the computation-decision unit 4 various different data, such as for example information specifying a character of an ingoing or outgoing episode determined by the computation-decision unit 4 or information confirming an attendance of a given subject. Such requests may be made available to a given subject by means of the output devices 251 (for example by means of a display) of the user interface 25, and in a response to such requests a given subject by means of the input devices (for example by means of a keyboard or a separate button for an attendance confirmation) of the interface 25 provides the requested information that are contained in the next transmitted notification message Nm in the form of an ingoing/outgoing episode character signal (Ioecs). The computation-decision unit may for example transmit by means of a confirmation message Cm to the identification module a request for an attendance confirmation in cases of determining an attendance status As as an "absent" value (determined for example based on a module motionless state determination) or an "abnormal" value or in random moments of time. A given subject provides the requested information by means of the input devices 252 of the interface 25. An appropriate attendance confirmation signal (Acs) is generated and comprised in the subsequently transmitted notification message Nm.

Confirmation messages Cm may also comprise requests for providing by the module 2' various different information not related to an attendance monitoring. For example the identification module 2' may be also used for generating identification signals (Is) required for logging in to the computer system 10. For example pushing an appropriate button on the interface 25 of the module 2' may cause an including in a notification message Nm an identification signal Is confirming an identity and attendance of a given subject in the monitored area, from which solely a logging in to the computer system 10 is permitted.

Figure 8:
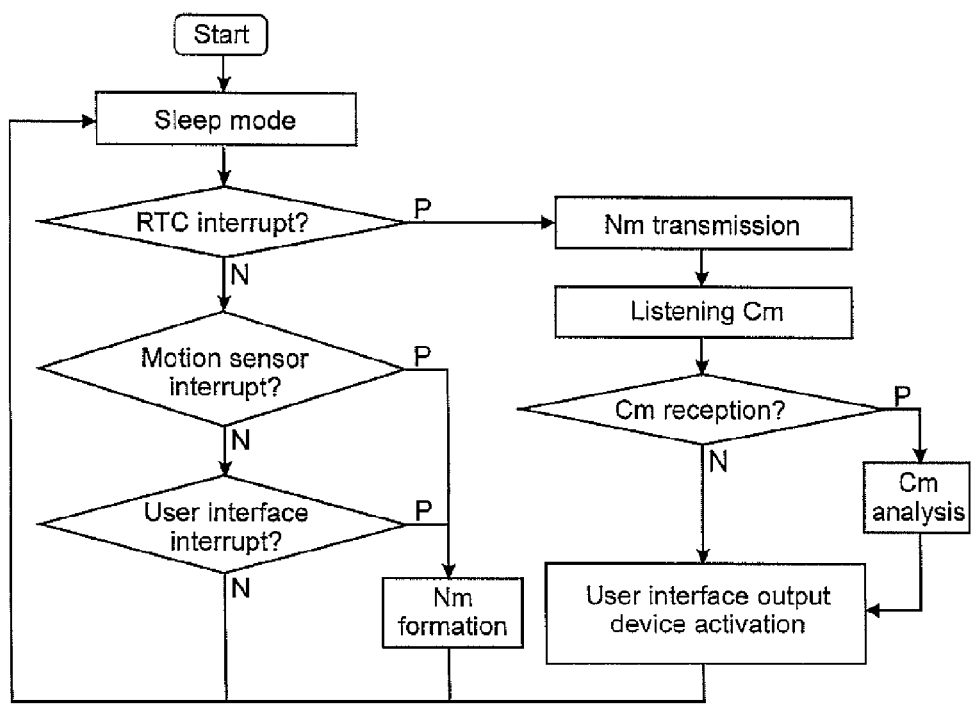
FIG. 8 presents a block diagram of a sleep mode of an identification module according to the present invention.

In order to ensure a possibly long running time using a battery individual internal power supply, a sleep mode of an identification module is activated independently, autonomously, during intervals between transmitting or receiving and an analysis of the messages Nm and Cm, wherein the sleep mode features a decreased energy consumption obtained in a result of a deactivation of some of identification module elements, such as for example the transmitter, the receiver and the user interface. An exemplary algorithm of an identification module 2' sleep mode activation and deactivation is presented in FIG. 8.

Typical mode of the module 2' operation is a sleep mode in which the transmitter 23 and the receiver 26 are completely deactivated, whereas the microcontroller 28 is partially deactivated and only a small part thereof operating the real time clock 45 and interrupts generated by the real time clock 45, the motion sensor 22 and the user interface 25, remains active. In the sleep mode the microcontroller 28 of the asleep module 2' periodically activates (activated by an interrupt of the real time clock 45) the transmitter 23 in order to transmit the notification message Nm. After transmitting the message Nm the transmitter 23 is deactivated into a sleep mode and for a predetermined time period the receiver 26 of the module 2' is activated in order to listening for an arrival of confirmation messages Cm that are possibly transmitted by the base unit 9c. At the beginning of this listening effected by the receiver 26, the microcontroller 28 is deactivated into a sleep mode and by default assumes that it has not received any confirmation message Cm. A reception of a confirmation message Cm causes an activation of the microcontroller 28 from a sleep mode, and a transferring thereto the data from the receiver 26 and a deactivation of the receiver 26. The microcontroller 28 analyzes the message Cm and for example takes an action related with a transmission of the information contained in the message Cm to the output device 251. A lack of a confirmation message Cm reception for a predetermined number of consecutive transmitted notification messages Nm evidences that the module 2' has been moved outside the monitored area and that fact may be signalized by the microcontroller 28 by means of transferring an appropriate information to the output device 251. Subsequently the next period of the real time clock 45 is programmed and the identification module is deactivated into the initial sleep mode with the transmitter 23 and the receiver 26 being completely deactivated and the microcontroller 28 being partially deactivated. Furthermore an activation of the module 2' from the sleep mode may be triggered by a generation of a motion signal by the motion sensor 22 of the module 2' inducing an activation of the microcontroller 28 for the purpose of an acquisition of data from the motion sensor 22, which data shall be contained in the next notification message Nm, and/or by a generation of a signal by the input device 252 of the interface 25, which also shall be appropriately considered in the content of the next notification message Nm.

In an alternative embodiment (not shown in the drawing) of a realization of a method according to the present invention, an analysis of a similarity of variability courses of motion signals Ims in the step 153 from FIG. 5 may be additionally used for determination of attendance of subjects that are associated with each other, i.e. subjects that are to be connected with each other. For the realization of such a method, a record of a subject in the memory connected to the computation-decision unit may comprise additional data related with an optional association of a given subject with different subjects. Thanks to that, the computation-decision unit may determine an attendance status of an "absent" or "abnormal" value of a given subject associated with other subject additionally also on the basis of information from such a memory on the association of this given subject with different subjects and in a case where an analysis of variability courses of motion signal of these subjects associated with each other does not reveal an appropriate similarity.

For a skilled technician it is obvious that the solutions according to the present invention may be employed for monitoring an attendance of any arbitrary subjects, not only human beings (including employees). Furthermore the solutions according to the present invention may be also used for improving a functionality of various types of geolocation solutions. For example when a localization of an identification module according to the present invention is known, the solution provides a possibility of determining the subject that is assigned to the given identification module and thus is present in the identified location. Such a solution enables for attributing geolocation data to a given subject and not only to a given identification module, and thus for a substantial improving reliability of this given subject localization.

The invention claimed is:

1. A method for an automatic monitoring of attendance of subjects within a monitored area comprising periodically:
  a) transmitting by a wireless transmitter (23) of at least one identification module (2), assigned and attachable to a given subject (7) the attendance of which is to be monitored, a notification message (Nm) comprising an individual attendance signal (Ias) comprising identification data of the given identification module (2) stored in the module internal memory (21);
  b) receiving by a wireless base receiver (3) notification messages (Nm) transmitted by the transmitter (23) of said at least one identification module (2) located within the monitored area (8) and in response thereto transmitting by a base transmitter (11) confirmation messages (Cm);

c) determining one or more attendance status signals (As) of individual subjects (7) within the monitored area (8) by a computation-decision unit (4), connected to said wireless base receiver (3), on the basis of notification messages (Nm) received by said base receiver (3) from identification modules (2) assigned and attachable to the individual subjects (7), wherein a given subject attendance status signal (As) of an absent value is determined in a case of:

a lack of a reception of an individual attendance signal (Ias) of an identification module (2) assigned to a given subject (7) for a first time period;

d) registering in a memory (5) by the computation-decision unit (4) an information related with attendance status signals (As) of the individual subjects (7) in the monitored area (8);

wherein the step a) additionally comprises transmitting in said notification messages (Nm) by the wireless transmitters (23) of the identification modules (2) individual motion signals (Ims) representing a motion of a given identification module (2) and obtained using an output signal of a motion sensor of the given identification module, attributing time stamps to the signals comprised in said notification message (Nm), wherein time stamps are generated based on real time clocks (RTC-27) of the identification modules synchronized with each other, by means of a real time clock (RTC-45) connected to the computation-decision unit (4), and the step c) additionally comprises determining by the computation-decision unit (4) a given subject (7) attendance status signal (As) of an absent value within the monitored area in a case of:

not exceeding a threshold value (Thr) for a second time period by the individual motion signal (Ims) of an identification module (2) assigned to the given subject (7), and additionally in a case of:

an occurrence for a third time period a degree of a similarity between a variability course of an individual motion signal (Ims) of an identification module (2) assigned to the given subject (7) and a variability course of an individual motion signal (Ims) of a different identification module (2) assigned to a different subject (7).

2. The method for an automatic attendance monitoring according to claim 1, wherein the step c) comprises determining by the computation-decision unit (4) the given subject (7) attendance status (As) of an absent or abnormal value within the monitored area (8) additionally in a case of:

a lack of an occurrence for a fourth time period a degree of a similarity between a variability course of an individual motion signal (Ims) of the identification module (2) assigned to the given subject (7) in a given time period and a reference standard variability course of an individual motion signal (Ims) of the identification module (2) assigned to said given subject (7) for a time period corresponding to the given time period.

3. The method for an automatic attendance monitoring according to claim 1, wherein the step c) comprises determining by the computation-decision unit (4) a given individual subject (7) attendance status signal (As) of an absent or abnormal value within the monitored area (8) additionally in a case of:

an occurrence of a degree of similarity between a variability course of an individual motion signal (Ims) of the identification module (2) assigned to the given subject (7) for the current time period and a variability course of an individual motion signal (Ims) of the same identification module (2 during a previous period corresponding to the current time period.

4. The method for an automatic attendance monitoring according to claim 1, wherein the individual motion signal (Ims) comprises a number (Ir) of motion episodes that occurred during a given time unit (Tn), and a time span (Rp) representing an overall time of a motion during in the given time unit (Tn), and a time stamp.

5. The method for an automatic attendance monitoring according to claim 1, wherein said degree of similarity is realized using a Pearson correlation.

6. The method for an automatic attendance monitoring according to claim 1, wherein in the step c) the computation-decision unit (4) determines an occurrence of an ingoing/outgoing of a subject (7) into/out of the monitored area (8) based on current and preceding attendance status signals (As), wherein an ingoing occurrence is determined in a case of a change of a preceding attendance status signal (As) of an absent or abnormal value into the current attendance status signal (As) of a present value, whereas an outgoing occurrence is determined in a case of a change of a preceding attendance status signal (As) of a present value into the current attendance status signal (As) of absent or abnormal value.

7. The method for an automatic attendance monitoring according to claim 1, wherein the step a) additionally comprises transmitting, in said notification message (Nm) by said wireless transmitter (23) of the at least one identification module (2), an individual environmental condition parameter signal (Iecps) representing environmental conditions of a given identification module and obtained using an output signal of an environmental condition parameter sensor (24) of the given identification module, and the step c) comprises determining by the computation-decision unit (4) a given individual subject (7) attendance status signal (As) of an absent or abnormal value within the monitored area (8) additionally in a case of:

an additional simultaneous occurrence for a time period a degree of similarity between a variability course of an individual environmental condition parameter signal (Iecps) of a given identification module (2) assigned to the given subject (7) and a variability course of an individual environmental condition parameter signal (Iecps) of an identification module (2) assigned to a different subject (7).

8. The method for an automatic attendance monitoring according to claim 1, wherein the step b) additionally comprises determining by the base receiver (3)

parameters of a transmission between the wireless transmitter (23) of the at least one identification module (2) and the base receiver (3), in particular at least one of signal strength, signal quality, and a distance between the wireless transmitter (23) of the at least one identification module (2) and the base receiver (3);

generating based on the transmission parameters an individual transmission parameter signal (Itps) and including the generated signal (Itps) into the notification message (Nm) transmitted to the computation-decision unit (4), whereas the step c) comprises determining by the computation-decision unit (4) a given individual subject (7) attendance status signal (As) of an absent or abnormal value within the monitored area (8) additionally in a case of:

an additional simultaneous occurrence for a time period a degree of similarity between a variability course of an individual transmission parameter signal (Itps) of the identification module (2) assigned to the given subject (7) and a variability course of an individual transmission parameter signal (Itps) of an identification module (2) assigned to a different subject (7).

9. The method for an automatic attendance monitoring according to claim 1, wherein the base transmitter (11) is connected to the computation-decision unit (4) when transmitting the confirmation messages (Cm), wherein the confirmation messages (Cm) comprise information from a memory (5) assigned to the given subject (7) assigned to the at least one identification module (2), wherein the information is related to one or more of attendance status signals (As) of the given subject, ingoing/outgoing occurrence moments (It, Ot) and with the remaining working time (Rwt), and at least one request for transmitting from the at least one identification module (2) an attendance confirmation signal (Acs), a signal of ingoing/outgoing occurrence type (Ioecs), or both, and wherein the method further comprises an additional step e) of receiving by a wireless receiver (26) of the identification module (2) located within the monitored area (8) a confirmation message (Cm), and making available the information, requests comprised in the confirmation message (Cm) to an output device (251) of a user interface (25) of the at least one identification module (2); whereas the step a) additionally comprises including in the notification message (Nm) at least one of an attendance confirmation signal (Acs), an ingoing/outgoing occurrence type signal (Ioecs) generated by means of a user interface (25) of the at least one identification module (2).

10. The method for an automatic attendance monitoring according to claim 1, wherein the method further comprises an additional preliminary step of producing an information of an optional association of a given subject (7) with other subjects (7), whereas the step c) comprises determining by the computation-decision unit (4) an attendance status signal (As) of a given individual subject (7) associated with other subjects (7) additionally based on information concerning association of the given subject (7) with the other subjects (7) and determining the given subject (7) attendance status signal (As) of an absent or abnormal value within the monitored area (8) additionally in a case of:

a lack of an occurrence for a time period a degree of a similarity between a variability course of an individual motion signal (Ims) of an identification module (2) assigned to the given subject (7) and a variability course of an individual motion signal (Ims) of a different identification module (2) assigned to a different subject (7) associated with the given subject (7).

11. A system for an automatic monitoring of attendance of subjects within a monitored area comprising:

1) at least two identification modules (2) assigned and attachable to individual subjects the attendance of which is to be monitored, each identification module comprising at least:

an internal memory (21), in which identification data of the identification module (2) are stored; and a wireless transmitter (23) periodically transmitting a notification message (Nm) comprising an individual attendance signal (Ias) comprising the identification data of the identification module (2);

2) a wireless base receiver (3) wirelessly receiving notification messages (Nm) transmitted by wireless transmitters (23) of said identification modules (2) located within the predetermined monitored area (8) and in response thereto transmitting by a wireless base transmitter (11) confirmation messages (Cm);

3) a computation-decision unit (4) connected to said base receiver (3) and determining attendance status signals (As) of individual subjects (7) within the monitored area (8) based on notification messages (Nm) received by the base receiver (3) from the identification modules (2) assigned and attachable to individual subjects (7), wherein a given subject attendance status signal (As) of an absent value is determined in a case of:

a lack of a reception of an individual attendance signal (Ias) of the identification module (2) assigned to a given subject (7) for a first time period;

4) a memory (5) connected to the computation-decision unit (4) and comprising records assigned to individual subjects (7) in which the unit (4) registers information related with attendance status signal (As) of individual subjects (7); wherein each identification module (2) additionally comprises a motion sensor and a real time clock (RTC-27) synchronizable with a real time clock (RTC-45) in the computation-decision unit (4), and the notification message (Nm) of the transmitter (23) of the identification module (2) comprises also an individual motion signal (Ims) representing the identification module (2) motion and obtained using an output signal of the motion sensor (22) of the identification module (2) and time stamps generated based on the real time clock (RTC-27) of the identification module (2), whereas the computation-decision unit (4) determines an individual subject (7) attendance status signal (As) of an absent value within the monitored area (8) in a case of:

not exceeding a threshold value (Thr) for a second time period by the individual motion signal (Ims) of an identification module (2) assigned to the given subject (7), additionally in case of:

an occurrence for a third time period a predetermined degree of a similarity between a variability course of an individual motion signal (Ims) of an identification module (2) assigned to the given subject (7) and a variability course of an individual motion signal (Ims) of a different identification module (2) assigned to a different subject (7).

12. The system for an automatic attendance monitoring according to claim 11, wherein the computation-decision unit (4) determines an individual subject (7) attendance status signal (As) of an absent or abnormal value within the monitored area (8) additionally in a case of:

a lack of an occurrence for a fourth time period a degree of a similarity between a variability course of an individual motion signal (Ims) of an identification module (2) assigned to the subject (7) in a given time period and a reference standard variability course of an individual motion signal (Ims) of the identification module (2) assigned to said subject (7) for a time period corresponding to the given time period.

13. The system for an automatic attendance monitoring according to claim 11, wherein the computation-decision unit (4) determines an individual subject (7) attendance status signal (As) of an absent or abnormal value within the monitored area (8) additionally in a case of:

an occurrence of the predetermined degree of a similarity between a variability course of an individual motion signal (Ims) of an identification module (2) assigned to the subject (7) for a current third time period and a variability course of an individual motion signal (Ims) of the same identification module (2) during previous time periods corresponding to the current third time period.

14. The system for an automatic attendance monitoring according to claim 11, wherein the individual motion signal (Ims) comprises a number (Ir) of motion occurrences during a given time unit (Tn), and a time span (Rp) representing the overall time of motion during a given time unit (Tn), and a time stamp.

15. The system for an automatic attendance monitoring according to claim 11, wherein the identification module (2) comprises an environmental condition parameter sensor (24), and the notification message (Nm) additionally comprises an individual environmental condition parameter signal (Iecps), and the computation-decision unit (4) determines an individual subject (7) attendance status signal (As) of an absent or abnormal value within the monitored area (8) additionally in a case of:

an additional simultaneous occurrence for a fifth time period a degree of similarity between a variability course of an individual environmental condition parameter signal (Iecps) of a given identification module (2) assigned to the subject (7) and a variability course of an individual environmental condition parameter signal (Iecps) of an identification module (2) assigned to a different subject (7).

16. The system for an automatic attendance monitoring according to claim 11, wherein the base receiver (3)

determines parameters of a transmission between a transmitter (23) of an identification module (2) and this base receiver (3), the parameters comprising in particular at least one of a signal strength, a signal quality, and a distance between the identification module transmitter and the base receiver, and generates based on determined transmission parameters an individual transmission parameter signal (Itps) transmitted to the computation-decision unit (4); and the computation-decision unit (4) determines an individual subject (7) attendance status signal (As) of an absent or abnormal value within the monitored area (8) additionally in a case of:

an additional simultaneous occurrence for a sixth time period a degree of a similarity between a variability course of an individual transmission parameter signal (Itps) of a given identification module (2) assigned to the subject (7) and a variability course of an individual transmission parameter signal (itps) of an identification module (2) assigned to a different subject (7).

17. The system for an automatic attendance monitoring according to claim 11, wherein the wireless base transmitter (11) is connected to the computation-decision unit (4) and transmits the confirmation messages (Cm) confirming receptions of notification messages (Nm), the confirmation messages (Cm) comprising information from the memory (5) assigned to the subject (7) assigned to a given identification module (2), the information being related with one or more of the attendance status signals (As) of the subject, ingoing/outgoing occurrence moments (It, Ot), remaining working time (Tp), transmitting a request from the computation-decision unit (4) for transmitting from a given identification module (2) an attendance confirmation signal (Acs), or a signal of the ingoing/outgoing occurrence type (Ioecs), or both, wherein the identification module (2) comprises a wireless receiver (26) receiving within the monitored area (8) the confirmation messages (Cm) transmitted by the base transmitter (3), and a user interface (25) comprising output devices (251), comprising a display, making available the information, requests or both information and requests comprised in a confirmation message (Cm), and input devices (252), comprising a touch matrix, buttons, or both, for generating an attendance confirmation signal (Acs), an ingoing/outgoing occurrence type signal (Ioecs), or both.

18. The system for an automatic attendance monitoring according to claim 11, wherein the memory (5) connected to the computation-decision unit (4) additionally comprises records attributed to particular subjects (7) in which information on associations between given subjects are registered, whereas the computation-decision unit (4) determines an individual subject (7) attendance status signal (As) of absent or abnormal value within the monitored area (8) additionally based on the information from the memory (5) on the association of the given subject (7) with other subjects (7) and in a case of: a lack of an occurrence for a predetermined time period a predetermined degree of a similarity between a variability course of an individual motion signal (Ims) of an identification module (2) assigned to the given subject (7) and a variability course of an individual motion signal (Ims) of a different identification module (2) assigned to a different subject (7) associated with the given subject (7).

* * * * *